(12) United States Patent
Stache et al.

(10) Patent No.: US 10,661,883 B2
(45) Date of Patent: May 26, 2020

(54) FUSED POROGEN PROCESS FOR ACOUSTIC SEPTA FABRICATION

(71) Applicant: The Boeing Company, Chicago, IL (US)

(72) Inventors: Erin E. Stache, Glendale, CA (US); Eric Herrera, Mukiteo, WA (US); Larken E. Cumberland, Mailbu, CA (US); Shahriar Alam, Chandler, AZ (US); Christopher S. Roper, Oak Park, CA (US); Geoffrey McKnight, Malibu, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/415,366

(22) Filed: May 17, 2019

(65) Prior Publication Data
US 2019/0270507 A1  Sep. 5, 2019

Related U.S. Application Data

(62) Division of application No. 14/641,537, filed on Mar. 9, 2015, now Pat. No. 10,336,433.

(51) Int. Cl.
| | |
|---|---|
| *E04C 2/36* | (2006.01) |
| *B32B 3/12* | (2006.01) |
| *B29D 24/00* | (2006.01) |
| *F02C 7/24* | (2006.01) |
| *B29C 33/52* | (2006.01) |
| *B64C 1/40* | (2006.01) |

(Continued)

(52) U.S. Cl.
CPC ............... *B64C 1/40* (2013.01); *B29C 33/52* (2013.01); *B29D 24/005* (2013.01); *B32B 3/12* (2013.01);
(Continued)

(58) Field of Classification Search
CPC .. G10K 11/172; G10K 11/162; G10K 11/168; Y10T 428/24149; Y10T 428/1234;
(Continued)

(56) References Cited

U.S. PATENT DOCUMENTS

| | | | |
|---|---|---|---|
| 3,910,374 | A | 10/1975 | Holehouse |
| 3,948,346 | A | 4/1976 | Schindler |

(Continued)

FOREIGN PATENT DOCUMENTS

| | | |
|---|---|---|
| EP | 2 126 898 | 11/2012 |
| EP | 1 866 489 | 5/2013 |

*Primary Examiner* — Jeffrey M Wollschlager
*Assistant Examiner* — Armand Melendez
(74) *Attorney, Agent, or Firm* — McDonnell Boehnen Hulbert & Berghoff LLP

(57) ABSTRACT

An example method for manufacturing a multicellular structure for acoustic damping is described that includes applying a porogen material to a solid support, inserting a multicellular frame into the solid support and through the porogen material so as to fill cells of the multicellular frame with the porogen material, fusing the porogen material, removing the multicellular frame from the solid support, and the multicellular frame contains a suspended fused porogen network attached to walls of the cells of the multicellular frame. The method also includes applying a solution to the suspended fused porogen network in the cells of the multicellular frame to percolate the suspended fused porogen network, curing the solution, and removing the suspended fused porogen network from the multicellular frame resulting in porous septum membranes of the cured solution in cells of the multicellular frame.

20 Claims, 7 Drawing Sheets

(51) Int. Cl.
  *F02C 7/045* (2006.01)
  *G10K 11/168* (2006.01)
  *G10K 11/172* (2006.01)
(52) U.S. Cl.
  CPC .............. *E04C 2/365* (2013.01); *F02C 7/045*
    (2013.01); *F02C 7/24* (2013.01); *G10K 11/168*
    (2013.01); *G10K 11/172* (2013.01)
(58) Field of Classification Search
  CPC ........... Y10T 29/4957; Y10T 29/49826; Y10T
    428/24165; Y10T 428/24273; Y10T
    156/1056; Y10T 29/49801; E04B
    2001/748; E04B 2001/82; B29D 24/005;
    B32B 3/12; B29C 33/52
  See application file for complete search history.

(56) References Cited

U.S. PATENT DOCUMENTS

| | | |
|---|---|---|
| 4,257,998 A | 3/1981 | Diepenbrock, Jr. et al. |
| 4,265,955 A | 5/1981 | Harp et al. |
| 4,336,292 A | 6/1982 | Blair |
| 4,475,624 A | 10/1984 | Bourland, Jr. et al. |
| 4,594,120 A | 6/1986 | Bourland, Jr. et al. |
| 5,041,323 A | 8/1991 | Rose et al. |
| 6,871,725 B2 | 3/2005 | Johnson |
| 7,434,659 B2 | 10/2008 | Ayle |
| 7,484,592 B2 | 2/2009 | Porte et al. |
| 7,854,298 B2 | 12/2010 | Ayle |
| 8,047,329 B1 | 11/2011 | Douglas et al. |
| 8,066,098 B2 | 11/2011 | Ayle |
| 8,235,171 B2 | 8/2012 | Douglas et al. |
| 9,127,452 B1 * | 9/2015 | Winfield ................. B32B 5/022 |
| 2006/0060421 A1 | 3/2006 | Sarin et al. |
| 2006/0219477 A1 | 10/2006 | Ayle |
| 2011/0278755 A1 | 11/2011 | Liu et al. |
| 2012/0037449 A1 | 2/2012 | Ayle |
| 2012/0077891 A1 | 3/2012 | Liu et al. |
| 2013/0062143 A1 | 3/2013 | Ichihashi |
| 2013/0341119 A1 | 12/2013 | Ichihashi |
| 2014/0133964 A1 | 5/2014 | Ayle |
| 2016/0264231 A1 | 9/2016 | Stache et al. |

* cited by examiner

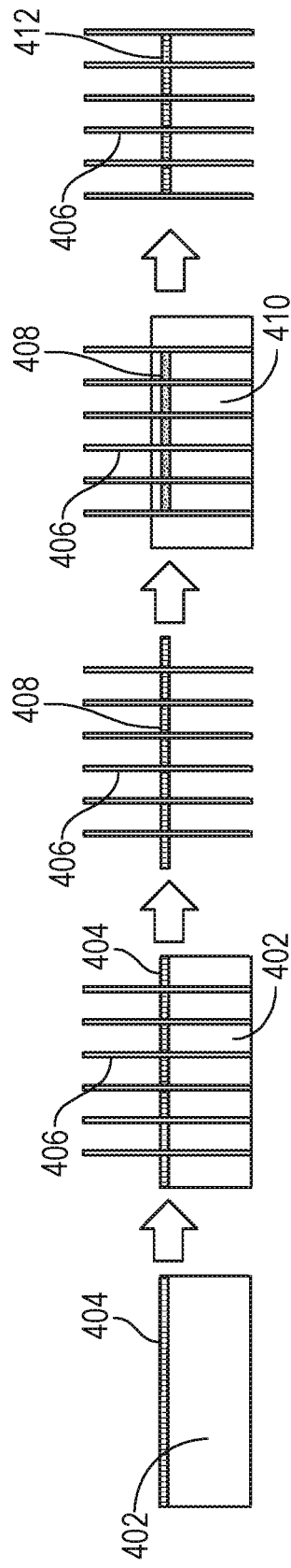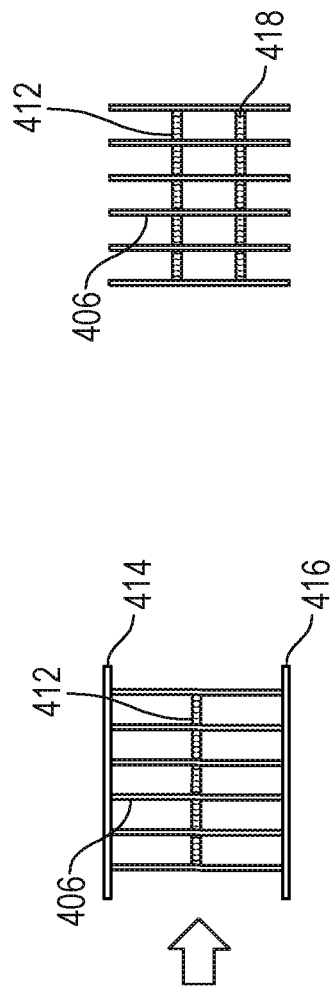

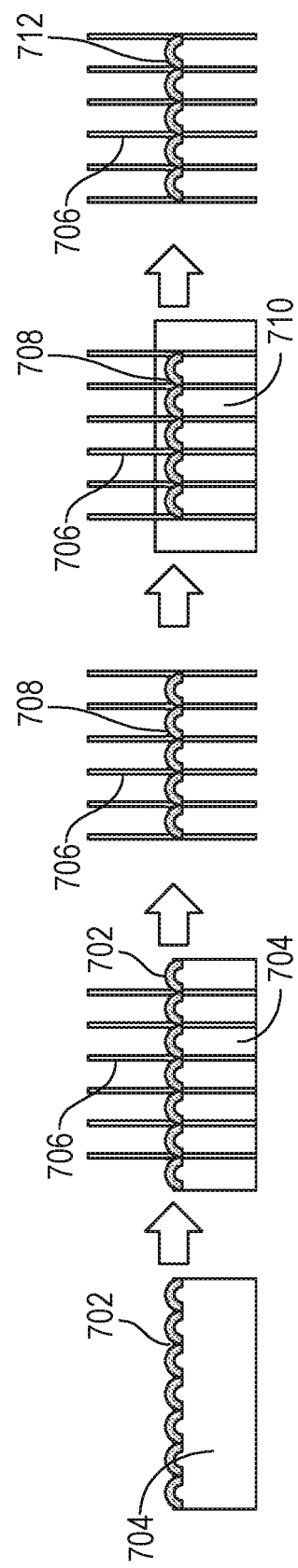

FUSED POROGEN PROCESS FOR ACOUSTIC SEPTA FABRICATION

CROSS REFERENCE TO RELATED APPLICATION

The present disclosure claims priority to and is a divisional of Ser. No. 14/641,537 filed on Mar. 9, 2015, the entire contents of which are herein incorporated by reference.

FIELD

The present disclosure relates generally to systems and methods for fabrication of acoustic structures that include a configuration of multiple septa.

BACKGROUND

Honeycomb core is commonly used in the fabrication of panels and other assemblies in the aerospace industry as the core provides structures with high strength and low weight. Honeycomb core panels are comprised of a honeycomb core that is bonded between face sheets. Acoustic honeycomb panels modify a structural assembly by forming resonant cavities within the core by perforating face sheets of the panels and/or fabricating internal septum membranes within their lumen for modifying sound.

Engine housing nacelle panels, as a specific example, are made of a honeycomb core that can be modified with porous internal and/or face sheets that create Helmholtz resonators for attenuating engine noise. For instance, by including acoustic treatments incorporating honeycomb structures in the nacelle housing, engine inlets and exhaust structures are provided to reduce cabin and environmental noise due to the jet engines. Some acoustic treatments use perforation of one or both of the face sheets to create the acoustic attenuating assembly. A resonance absorption frequency of the treatment structure is determined by cell sizes and hole dimensions, and thicknesses of the face sheets. The cells of the honeycomb core act as resonant chambers in which the noise is transformed into waves of different frequencies and this sound energy is then converted into heat, which dampens the incoming noise. One downside of this approach is that fabrication costs of drilling holes of the face sheet are high and labor intensive, and are limited to large sizes.

Other designs for honeycomb-based acoustic damping structures involve an assembly of a double layer of honeycomb core with a septum bonded between the two honeycomb sections. Facing sheets are applied to both of the external surfaces of this assembly with an adhesive. Construction of this assembly requires multiple adhesive bond lines that reduce the mechanical strength of the overall panel. Alignment of the individual cells can also be difficult between adjacent sections. Furthermore, heat transfer is often degraded because of the insulating adhesive bonding interfaces and the misalignment of the metal cells.

In still other designs, septum caps are placed at different depths within the lumen of the honeycomb cells. Generally complex machining and assembly techniques are required for these designs, and thus add to the expense and labor of this approach. There are other numerous examples in which cores are modified, and even crushed in some cases, to create sound barriers.

Further, externally formed foam plugs have been used to fill the cavities, but are expensive to insert and lack depth control.

Existing fused porogen and/or particulate leaching processes have been utilized to fabricate polymer foams used in several different applications, particularly relating to bioscaffolds. These processes can involve a particle fusion step, followed by application of a biodegradable polymer and particulate leaching to reveal a polymeric foam structure. These types of structures have not been utilized for acoustic cores. Additionally, existing types of structures would likely suffer from several drawbacks in application to acoustic damping structures, including ease and control of insertion and septum adhesion to the core, which is desired for acoustic performance. In addition, the requirements for open porosity on both sides of the septum, i.e. continuous flow permeability, distinguish the needs of acoustic septa fabricated using the particle fusion scaffold technique from previous applications of this technique. Furthermore, existing materials sought to fabricate polymeric foams from fused porogen and/or particulate leaching processes are generally unsuitable for aerospace and automobile applications, e.g. due to the temperature, vibration, chemical, and strain environments.

What is needed is an acoustic structure and fabrication process that is a scalable process and does not require multiple insertion steps for each individual cell of the structure, to enable a lower cost and less labor intensive process, that has greater flexibility in terms of cell size and porosity of the structure.

SUMMARY

In one example, a method for forming porous membranes within a multicellular frame for manufacturing a multicellular structure is described. The method comprises templating the multicellular frame with a fused porogen network so as to create a multicellular frame-porogen assembly, applying a polymer into the fused porogen network of the multicellular frame-porogen assembly, and removing the fused porogen network from the multicellular frame-porogen assembly resulting in polymeric septum membranes within the multicellular frame.

In another example, a method for manufacturing a multicellular structure for acoustic damping is described that includes applying a porogen material to a solid support, inserting a multicellular frame into the solid support and through the porogen material so as to fill cells of the multicellular frame with the porogen material, fusing the porogen material, removing the multicellular frame from the solid support, and the multicellular frame contains a suspended fused porogen network attached to walls of the cells of the multicellular frame. The method also includes applying a solution to the suspended fused porogen network in the cells of the multicellular frame to percolate the suspended fused porogen network, curing the solution, and removing the suspended fused porogen network from the multicellular frame resulting in porous septum membranes of the cured solution in cells of the multicellular frame.

In another example, an acoustic damping structure is described comprising a multicellular frame, and at least one porous septum membrane positioned in lumen of cells of the multicellular frame. The at least one porous septum membrane comprises a substantially continuous matrix, and the at least one porous septum membrane includes pores with a size less than about 25% of the thickness of the septum membrane.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIGS. 4A-4G are schematic illustrations of the process flow for fabrication of a porous septum membrane using a solid support layer and a fused porogen process according to the method of FIG. 3, and according to an example embodiment.

FIGS. 7A-7E are schematic illustrations of the process flow for fabrication of a porous septum membrane using a curved solid support layer and a fused porogen process, according to an example embodiment.

DETAILED DESCRIPTION

Figure 2:
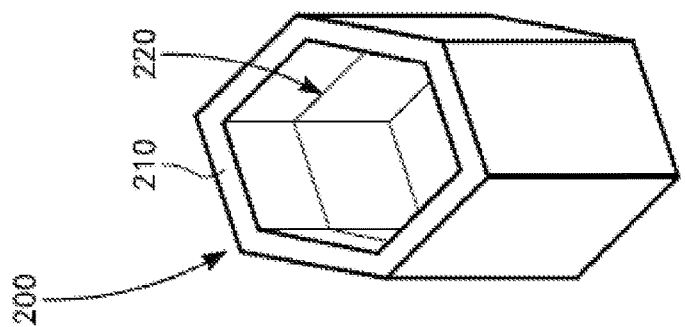
FIG. 2 is a schematic illustration of an example cell, according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples herein, a fused porogen process for acoustic septa fabrication is described to manufacture a structure that may be used, for example as an acoustic controlling structure for aircraft and aerospace applications. The structure may be based on a honeycomb core with septa/wall membranes suspended within lumen/interior space of cells. Polymeric septa are formed in situ via a fused porogen/particulate leaching process.

Configuration and acoustic controlling properties of the structure are determined via the in situ porogen fusing process, which may ultimately be independent of the polymer characteristics. A combination of porogen fusion with a solid support may control (1) positioning of porogen within the cell lumen, (2) thickness of membranes and (3) angular orientation of the septum membrane to the core wall, for example.

In a specific example, a porogen fusing process controls (1) pore interconnectivity within the septum membrane, (2) pore size within the septum membrane, and (3) control of the septum membrane attachment to the core wall. Pore interconnectivity and size can be modified by selecting porogens of different shapes and sizes permitting control of the acoustic controlling properties over a wide range of frequencies. For example, smaller porogens will lead to smaller pores in the fused porogen network and thus smaller pores in the septa. This, in turn, leads to (1) higher pressure drop per unit thickness of the septa and (2) flow being controlled more by viscous forces than by inertial forces, and thus a more linear increase in pressure loss with increasing flow velocity. Longer fusing times, higher fusing temperatures, and more humid fusing environments will reduce the magnitude of constrictions at the interconnections between pores in the fused porogen network, thus reducing the magnitude of constrictions at the interconnections between pores in the septa. This, in turn, reduces the magnitude of nonlinear pressure loss due to flow constrictions and expansions within the septa. Pressure loss and the linearity of pressure loss with increasing flow velocity in the septa can be used to design the acoustic controlling properties of Helmholtz resonators formed, in part, by the multicellular cells, the septa, and the facesheets. In addition, mixed porogen processes including (1) combination of different sized porogens, (2) combination of different types of porogens and (3) combination of different types of particles (those that may or may not be removed) can increase complexity of a final polymeric microstructure and affect acoustic controlling properties. The septa may be formed from polymeric materials whose mechanical properties can be selected for specific acoustic controlling and resonance performance properties, and whose characteristics can be independent of overall structure and process.

The acoustic structure may be used to control noise from engines and other noise sources on aircraft and aerospace vehicles. The septa membranes in the honeycomb core can be designed to create pressure barriers, flow restrictors, and resonant cavities for controlling transmission of acoustic noise. Acoustic treatments to the honeycomb core and application to the nacelle, engine inlets, and exhaust structures can address jet engine noise using shrouds, and electrical power station noise using enclosures.

Figure 1:
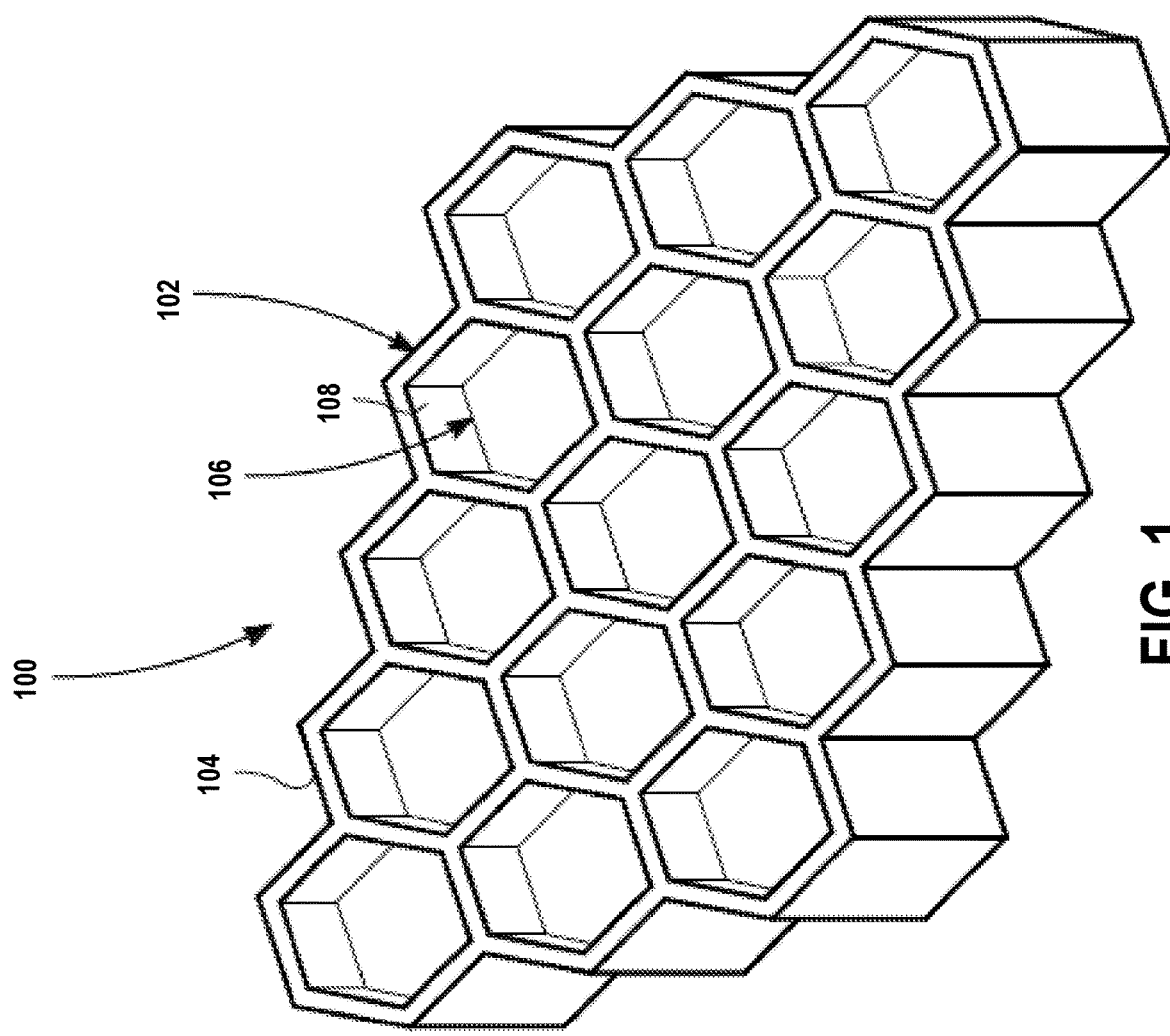
FIG. 1 is a schematic illustration of an example acoustic attenuator structure, according to an example embodiment.

Referring now to the figures, FIG. 1 is a schematic illustration of an example acoustic attenuator structure 100. The structure 100 in FIG. 1 is a multicellular structure in a form of a honeycomb/septum. Top and bottom face sheets can be provided (shown below) to complete a formation of two cavities within each cell, such as cell 102. The acoustic structure 100 includes a honeycomb frame 104 with septum membranes 106 suspended within an interior of the cells 102.

Various implementations are applicable to fabrication of septum membranes with a wide range of honeycomb cell sizes and patterns (i.e. hexagons, diamond, etc. or non-geometric shapes and regular and irregular array patterns). The honeycomb frame may be comprised of aluminum, titanium, carbon composites, aramid, or fiberglass. The septum membranes 106 are formed in situ, with complete attachment to cell walls 108, thus providing pressure tight seals. Single or multiple membranes can be positioned anywhere along the honeycomb cell lumen (e.g., lumen being hollow space or cavity inside a cell) forming symmetric or customized asymmetric cavities. A porosity of the membrane 106 enables acoustic resonators to be formed (e.g., Helmholtz-type resonators). Acoustic resonance properties are determined by a cavity within the cell lumen and membrane 106 parameters (i.e. cavity size, membrane thickness, pore size, pore number, and pore size distribution).

FIG. 2 is a schematic illustration of an example honeycomb cell 200. The cell 200 includes face 210 and a septum membrane 220 parallel to the face 210 of the honeycomb cell 200. The septum membrane 220 spans full dimensions of an interior of the cell 200 and its thickness can be controlled in a range of about 1 mm to 5 mm, for example.

The multicellular structure shown in FIG. 1 may be an acoustic damping or modifying structure that includes a multicellular frame (e.g., honeycomb core) and a one porous septum membrane positioned in lumen of cells of the multicellular frame. The porous septum membrane may include a substantially continuous matrix of a hardened material. The material may include one or more of an elastomer, an epoxy, a silicone, a thermoplastic, and a thermoset polymer. As described with reference to FIG. 2, the porous septum membrane may include pores in a range of about 10 μm to about 1000 μm or about 1 μm to about 175 μm, and a thickness of about 1.0 mm to about 5.0 mm. Porosity of the membrane may be controlled to that of about 0.1 to 0.98, for example. The porous septum membrane may include pores with a size less than about 15% of the thickness of the septum membrane, or in other examples, pores with a size less than about 10% of the thickness of the septum membrane.

FIG. 2 is a schematic illustration of a hexagonally shaped septum membrane 220 positioned within the lumen of a honeycomb structure. While the membrane 220 is shown parallel to the face 210 of the honeycomb cell 200, an angular position of the septum membrane 220 can be controlled by tilting a polymer precursor interface in the cell (controllable from 0° to 85° off normal). Porosity of the septum membrane 220 can also be controlled by utilizing specific polymer precursor formulations that contain non-cross linking, dissolvable components or adding external photo-masking layers or components. Specifics of these processes will be discussed in detail below.

Figure 3:
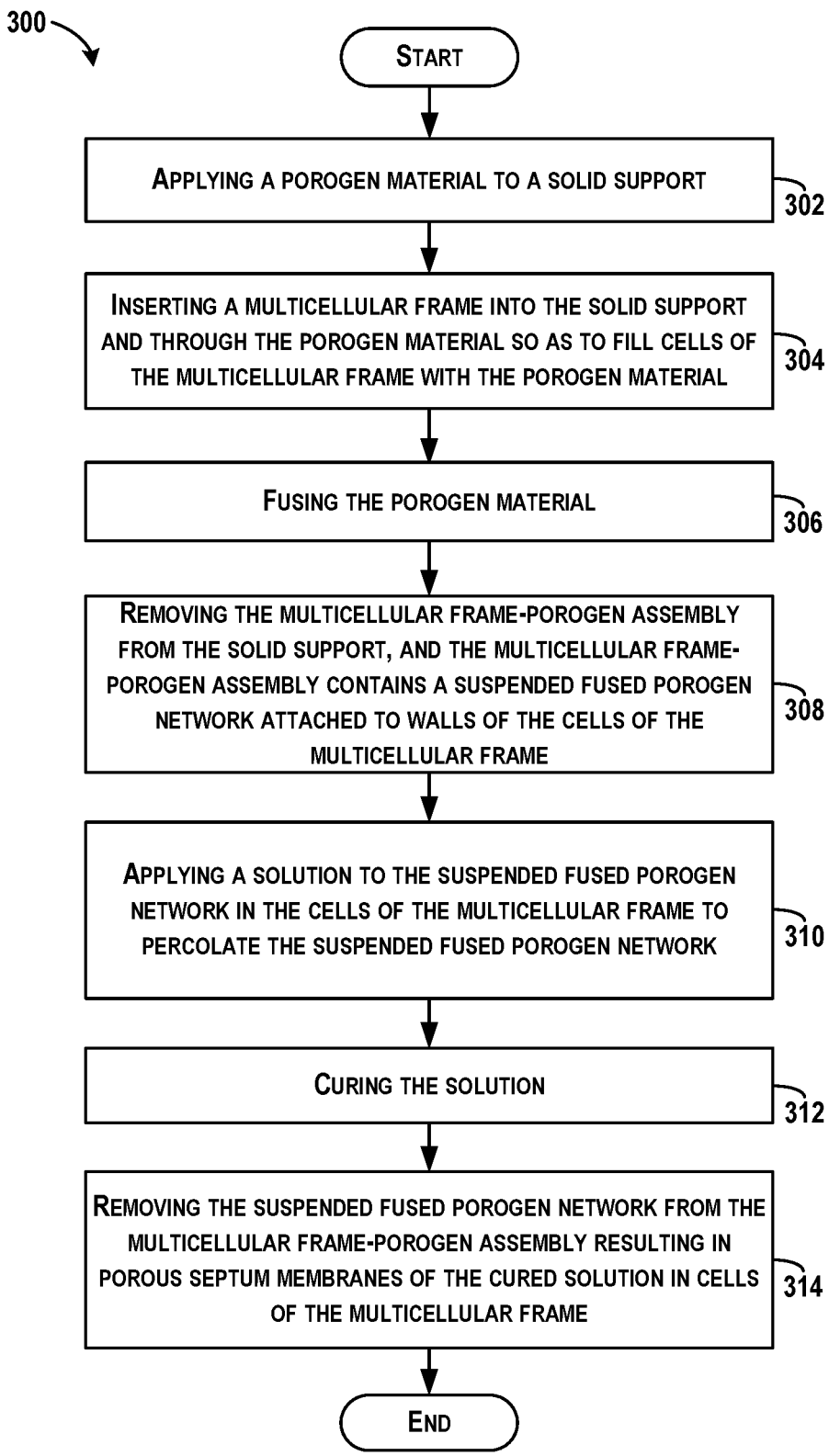
FIG. 3 shows a flowchart of an example method for manufacturing a multicellular structure for acoustic damping, according to an example embodiment.

FIG. 3 shows a flowchart of an example method 300 for manufacturing a multicellular structure for acoustic modification. Method 300 shown in FIG. 3 presents an embodiment of a method that, for example, could be used to form a structure for use in any number of systems for acoustic modifications such as damping. Method 300 may include one or more operations, functions, or actions as illustrated by one or more of blocks 302-314. Although the blocks are illustrated in a sequential order, some blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 302, the method 300 includes applying a porogen material to a solid support. The solid support may include a cornstarch-methanol slurry or other powder and solvent slurry that may be poured into a tray and allowed to set. The solvent slurry may include a polar protic solvent, for example methanol, ethanol, isopropanol or water. The powder may dissolve in the solvent, forming a homogenous solution. Within examples, the powder and solvent may be chosen such that the slurry forms a smooth, solid support upon setting. The solid support may be screeded flat after setting. The porogen material may include sodium chloride, or may be of a type of material such as a salt, a sugar, an organic solid, a glass solid particle, a ceramic solid particle, sand, or a polymer particle. The porogen material may further be of a type or shape of material such as a cubic particle, a spherical particle, an amorphous particle, a rod particle, a whisker-like particle, a leachable particle, and a non-removable polymer particle. The porogen material may be poured onto a surface of the solid support to evenly cover a top surface, for example.

FIGS. 4A-4G are schematic illustrations of the process flow for fabrication of a porous septum membrane using a solid support layer and a fused porogen process according to the method 300 of FIG. 3. In FIG. 4A, a solid support 402 is shown, and a porogen material 404 is applied to a surface of the solid support 402. A thickness and insertion depth of the septum membranes is determined in this step based on a thickness of the porogen material 404 and the solid support 402.

The solid support 402 includes a penetrable solid network that is unreactive with the porogen material 404 and honeycomb core and is resistant to fusing conditions. A class of materials for the solid support 402 includes silicates, sugars, starches or hydrogels. The porogen material 404 may include any leachable material, such as salts, sugars, organic solids or dissolvable polymers. The porogen material 404 may include particles of different shapes (cubic, round, elongated, or tube-like) and of different sizes (e.g., 10-1000 μm, 50-1000 μm, 10-175 μm and any size distributions therein).

Referring back to FIG. 3, at block 304, the method 300 includes inserting a multicellular frame into the solid support and through the porogen material so as to fill cells of the multicellular frame with the porogen material. The multicellular frame includes a honeycomb frame, and may comprise fiberglass, aluminum, aramid, titanium, or other material.

FIG. 4B illustrates a honeycomb core wall 406 inserted into the solid support 402 and through the porogen material 404. The core wall 406 may be placed on top of the solid support 402 and the porogen material 404 composite by avoiding disturbing the porogen layer. The core wall 406 may be pushed through the porogen material 404 and into the solid support 402 evenly in one motion. Insertion depth can be anywhere through a thickness of the core as desired for the solid support thickness and core thickness per an application.

Referring back to FIG. 3, at block 306, the method 300 includes fusing the porogen material. In an example process, fusing includes applying a humidity atmosphere (e.g., place in humid oven at e.g. >50% relative humidity, or >95% relative humidity and 37° C.) for a given amount of time which may be about 15 hours. The fusing process may also include applying a thermal atmosphere (e.g., place in drying oven at e.g. a temperature greater than room temperature room temperature or 50° C., possibly including convection) for a given amount of time, which may be about 5 hours, to form the suspended fused porogen network that attaches to the walls of the cells of the multicellular frame.

Thus, fusing the porogen may include a chemical treatment, a thermal treatment, or combination of a chemical and a thermal treatment. The fusion process is applied to make a continuous network and attach the porogen network to the core wall.

Alternative fusing conditions can be implemented depending on a choice of porogen material. These include, for example, alternative humidity/thermal processes, thermal only fusing processes where the fusing temperature is near or above a melting point of the porogen, and chemical fusing processes where an additional chemical agent is employed to fuse the porogen network or any combination thereof. Post fusing processing may also be employed to improve interconnectivity of the fused network, such as a vacuum assisted drying procedure. Additionally, chemical modification, such as a dipping process, of the fused network can be employed to change the "wetting" characteristics of the fused network upon polymer incorporation. This type of process can induce alternative levels of porosity to ultimately affect the acoustic damping properties.

At block 308, the method 300 includes removing the multicellular frame from the solid support, and the multicellular frame-porogen assembly includes a suspended fused porogen network attached to walls of the cells of the multicellular frame. In an example, the core can be lifted out of the solid support and brushed off for edge cleaning.

FIG. 4C illustrates the honeycomb core wall 406 removed from the solid support layer to reveal a suspended fused porogen network 408.

Figure 5B:
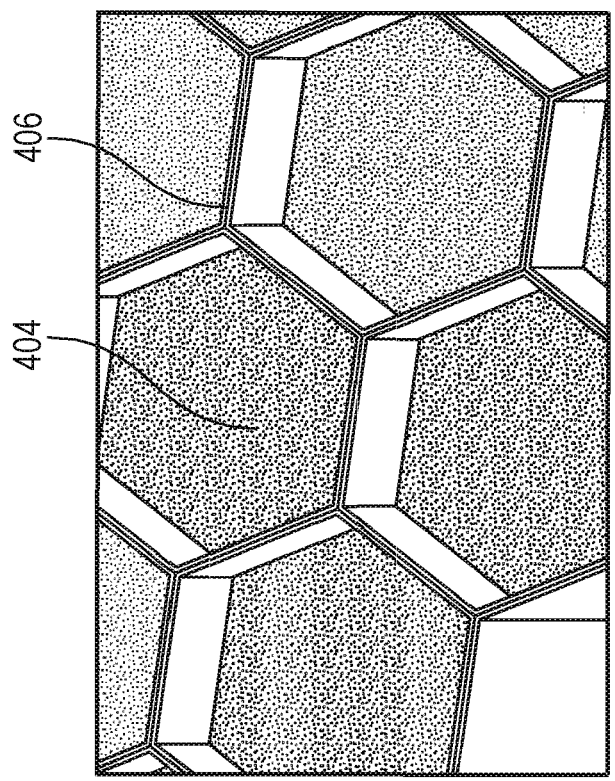
FIG. 5B illustrates an example of the suspended fused porogen network within the cell, according to an example embodiment.
Figure 5A:
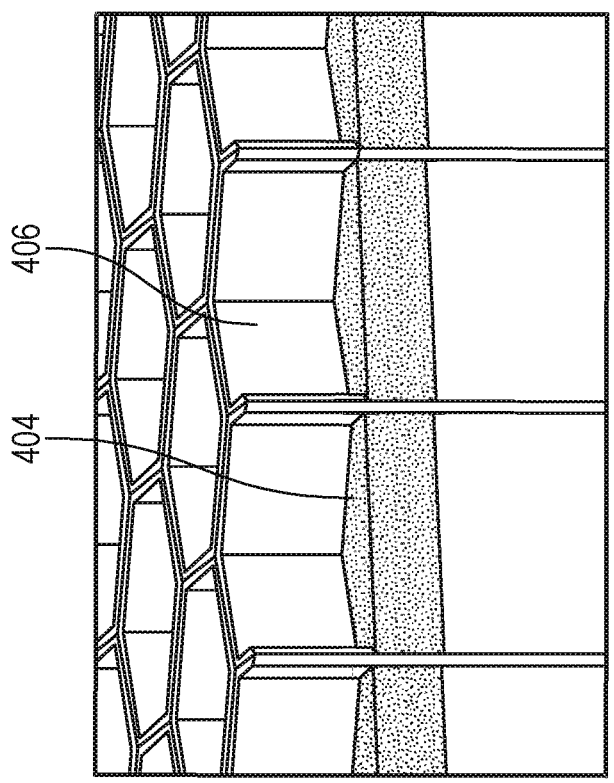
FIG. 5A illustrates an example of the suspended fused porogen network and adhesion to the core wall in the absence of chemical additives or polymer, according to an example embodiment.

FIG. 5A illustrates an example of the suspended fused porogen network 404 and adhesion to the core wall 406 in the absence of chemical additives or polymer. FIG. 5B illustrates an example of the suspended fused porogen network 404 within the cell.

Referring back to FIG. 3, at block 310, the method 300 includes applying a solution to the suspended fused porogen network in the cells of the multicellular frame to percolate the suspended fused porogen network. The solution application may include a baking process, a vacuum assisted baking process, or a dip into a surfactant or other chemical treatment. As an example, application of the solution includes immersing the multicellular frame into a polymer resin solution to coat the suspended fused porogen network with the polymer resin solution.

Applying the solution may further include applying a polymer precursor material and solvent to the suspended fused porogen network in the cells of the multicellular frame to percolate the suspended fused porogen network, and curing the polymer precursor solution. The solution may be a polymer resin not diluted with a solvent, and a polymer resin diluted with a solvent. Properties of the septum membrane can be controlled by selection of the solution. Possible classes of polymer resins for use as the solution include epoxies, phenolics, acrylonitriles, urethanes, silicones, PDMS, acrylates and thiol-enes or any combination thereof.

FIG. 4D illustrates the core wall 406 and fused porogen network 408 being immersed in a polymer resin solution 410 to coat the fused porogen network 408 with the polymer material. The core wall 406 may be immersed for an amount of time to coat the fused porogen network 408, and then removed and allowed to drain for an amount of time.

Alternative solution incorporation techniques can be implemented to modify porosity of a final septa membrane. An amount of solution or polymer applied to the fused porogen network can be modified by polymer concentration, depth of polymer solution relative to the fused network, a length of time the solution is allowed to percolate the network and any post solvent rinses to remove excess polymer solution from the network. Furthermore, polymer integration may be modified by heating or cooling of an uncured resin solution or fused network prior to permeation and/or involve a vacuum assisted incorporation and/or curing mechanism. Each of these different techniques can induce alternative levels of porosity in combination with the porosity induced by the fused porogen network which may ultimately affect the acoustic properties.

Additional mixed porogen or porogen/particle systems can be employed to also modify the acoustic properties of the septa membrane. A mixed porogen system can involve an assortment of different sizes of one particular porogen material. A size disparity can create different pore interconnectivity and pore size within the septum membrane. Alternatively, a mixed porogen system can involve two different types of porogens, for example, sucrose and sodium chloride, that have different shapes. A combination of the two different shapes can modify the pore interconnectivity and pore size, affecting the acoustic properties.

Furthermore, a mixed porogen/particle system can be employed. This involves the combination of a porogen and a particle that remains in the polymer network after porogen removal. Incorporation of this particle can modify pore interconnectivity, pore size and ultimately the mechanical properties of the septum membrane. The inclusion of this particle, which may be a polymeric bead compatible with the polymer membrane selection, can improve adhesion to the core wall which may improve the acoustic properties of the porous septum membrane.

Another embodiment for manufacturing an acoustic device uses anisotropic porogens to result in a polymer network with anisotropic pores. Anisotropic porogens can include salt whiskers, salt wires, anisotropic salt crystals, or isotropic salt crystals that are pre-fused into anisotropic sub-units. An interconnected network of anisotropic pores has lower pressure losses due to flow expansion and flow contraction compared to an interconnected network of isotropic pores. Pressure losses due to expansion and contraction are quadratically related to the flow velocity. Non-linear pressure loss limits a bandwidth over which acoustic septa treatments may be effective, thus anisotropic pores and porogens can result in increased bandwidth of acoustic damping structures, for example.

Figure 6B:
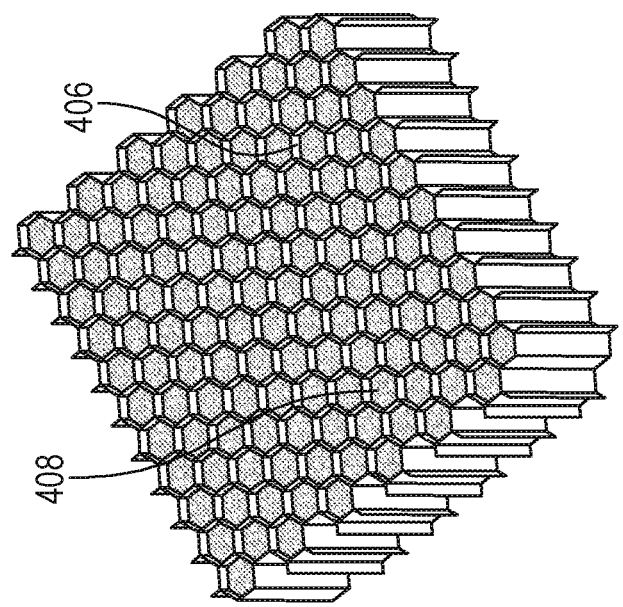
FIG. 6B illustrates an example device with porous polymer septa membranes, according to an example embodiment.
Figure 6A:
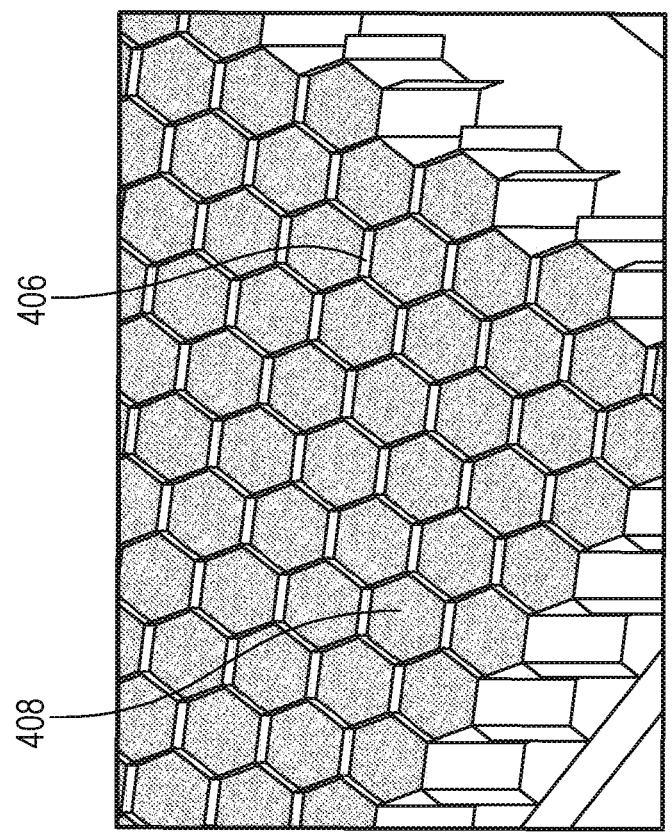
FIG. 6A illustrates an example fused porogen network permeated by a cured polymer resin, according to an example embodiment.

FIG. 6A illustrates an example fused porogen network 408 permeated by a cured polymer resin. FIG. 6B illustrates an example device with porous polymer septa membranes.

Referring back to FIG. 3, at block 312, the method 300 includes curing the solution. The solution may be cured by applying a thermal atmosphere (e.g., at a temperature greater than room temperature, >50° C., or 177° C.) for a given amount of time (e.g., >1 hour or 3 hours) to set a microstructure of the solution. The microstructure of the solution is configured to create one or more of pressure barriers, flow restrictors, and resonant cavities for controlling transmission of acoustic noise.

At block 314, the method 300 includes removing the suspended fused porogen network from the multicellular frame-porogen assembly resulting in porous septum membranes of the cured solution in cells of the multicellular frame. As an example, the multicellular frame-porogen assembly can be placed into a water bath (e.g., such as a circulating water bath with continuous water replacement for 3 hours), and the porous septum membranes can be dried in the cells of the multicellular frame (e.g., place in oven and dry at e.g. greater than room temperature or 50° C. for e.g. >1 hour or 3 hours).

Thus, a fused porogen network may be removed by dissolving the particles in an aqueous medium. Alternatively, a chemical treatment may be applied to remove the fused network. Additionally, particular types of particles may be removed by sublimation. A post processing technique can also be implemented to affect the septum membrane after particulate leaching. This may include a chemical treatment or additional coating procedure with polymer resin to improve smoothness of open porosity and/or improve adhesion to the core wall, which may affect the acoustic properties, for example.

FIG. 4E illustrates removal of the porogen to reveal the open porosity of septa 412 in the core wall 406. Following, the multicellular frame containing the porous septa may be formed into a curved shape, for example by thermoforming. The curved shape may have one or two radii of curvature. Following, as shown in FIG. 4F, top and bottom face sheets 414 and 416 can be added to complete a formation of two cavities within each cell, for example. In some examples, the top face sheet 414 and/or the bottom face sheet 416 may be perforated.

An example acoustic microstructure has been made using an epoxy resin (Loctite 9396) to form the septum membrane. The solid support included a cornstarch-methanol slurry (e.g., 58:42 ratio by weight) that was allowed to self-level and set until dry to the touch. This process determined an insertion depth of about 4.0 mm. Sodium chloride (e.g., 150-250 μm) was applied to the solid support and levelled to a depth of 2.0 mm to form the porogen layer. The honeycomb core was inserted and a thermal/moisture (>95% relative humidity and 37° C.) induced fusing process was applied for 8 hours. The fused porogen network was set by oven drying at 82° C., at which time the solid support was removed revealed the suspended fused porogen network. The epoxy resin was applied as a solution in acetone (40% w/w) by dipping the suspended porogen network in the solution. The polymer matrix was set through a thermal curing process at 82° C. for 2 hours. Removal of the fused porogen network was accomplished via leaching in deionized water for several hours with several water changes. A final drying step at 82° C. revealed the suspended septum membrane with acoustic properties.

In additional examples, multiple septa may be created within the multicellular frame, as shown in FIG. 4G, which may be a further or optional step in the formation. For example, the septa 412 may be created in the core wall 406 as described above, and another septa 418 may be created in the same manner following creation of the first septa 412. The core wall 406 can be turned upside down to perform the same process on the other side, and after provided face sheets, three separate cavities may be generated in the core wall 406 to provide unique acoustic damping features. In still other examples, a first septa may be formed using the method shown and described in FIGS. 4A-4F, and a second septa can be a woven fabric or perforated film adhesive or any other septa. Similarly, a first septa can be a woven fabric or perforated film adhesive or any other septa, and a second septa can be formed using the method shown and described in FIGS. 4A-4F.

Another embodiment for manufacturing an acoustic device includes modification of the septum membrane orientation. By adaptation of the solid support to a curved surface for each cell, the porogen fusing step can allow for the formation of a curved fused network. FIGS. 7A-7E are schematic illustrations of the process flow for fabrication of a porous septum membrane using a curved solid support layer and a fused porogen process. FIG. 7A demonstrates application of a mixed porogen/particle network 702 to be fused onto a solid support 704. Both thickness and insertion depth of the septum membranes is determined in this step, based on thickness of the porogen material and solid support. A convex surface of the solid support 704 will create a convex porogen layer. A honeycomb core 706 is then inserted into the porogen/solid support composite, as shown in FIG. 7B. A porogen fusion technique is applied to make a continuous fused porogen network 708 and attach the network to the core wall 706. The honeycomb is removed from the solid support layer to reveal a suspended convex porogen network, as shown in FIG. 7C. The fused network is immersed in a polymer resin 710 to coat the fused network with the polymer resin, as shown in FIG. 7D. Upon draining the solution, a curing process is applied to the polymer resin to set the polymer network. To reveal the open porosity, the porogen is removed and the convex porous membrane 712 is revealed, as shown in FIG. 7E. Using a convex structure may result in improved septum to core adhesion as well as an enhancement of acoustic control, for example.

Figure 8:
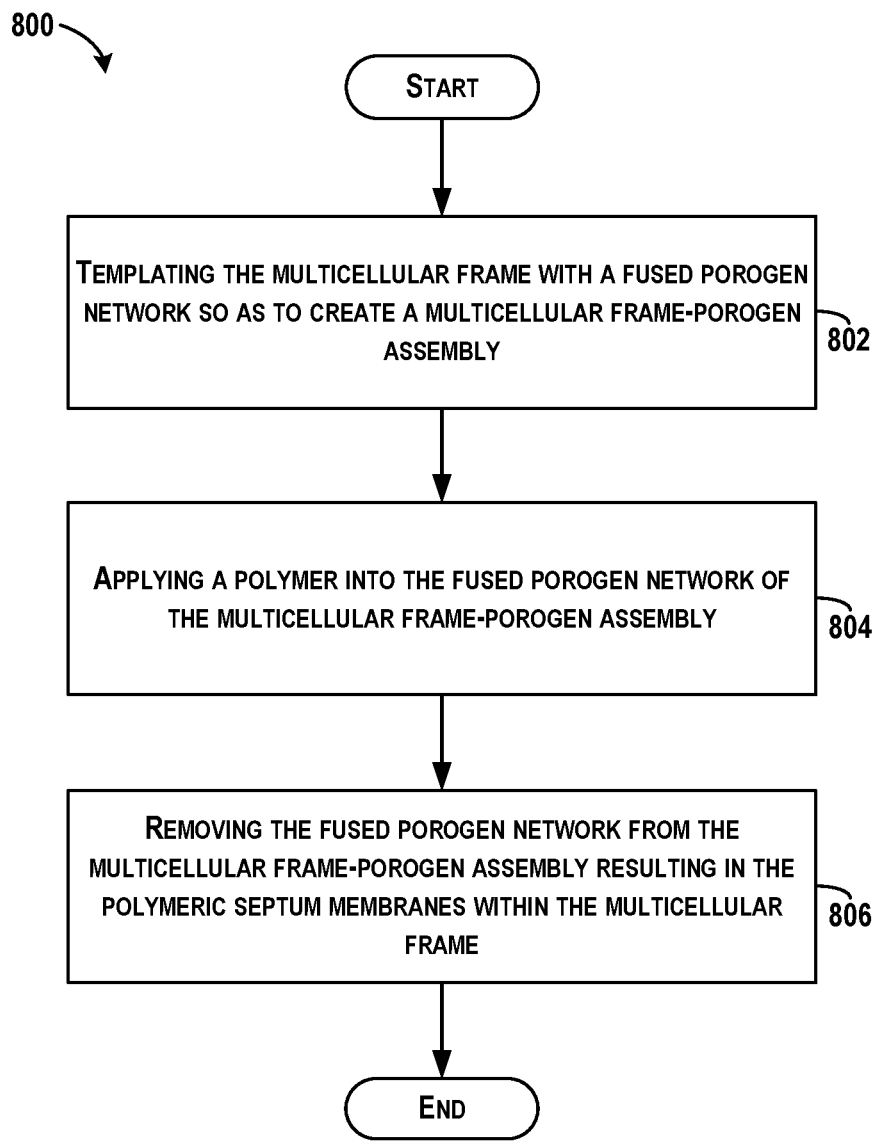
FIG. 8 shows a flowchart of another example method for forming polymeric septum membranes within a multicellular frame for manufacturing a multicellular structure, according to an example embodiment.

FIG. 8 shows a flowchart of another example method 800 for forming polymeric septum membranes within a multicellular frame for manufacturing a multicellular structure. Method 800 may include one or more operations, functions, or actions as illustrated by one or more of blocks 802-806. Although the blocks are illustrated in a sequential order, some blocks may also be performed in parallel, and/or in a different order than those described herein. Also, the various blocks may be combined into fewer blocks, divided into additional blocks, and/or removed based upon the desired implementation.

At block 802, the method 800 includes templating the multicellular frame with a fused porogen network so as to create a multicellular frame-porogen assembly. The templating process applies a porogen material to a solid support, inserting the multicellular frame into the solid support and through the porogen material so as to fill cells of the multicellular frame with the porogen material, fusing the porogen material, and removing the multicellular frame from the solid support. Following removal, the multicellular frame contains a suspended fused porogen network attached to walls of the cells of the multicellular frame.

At block 804, the method 800 includes applying a polymer into the fused porogen network of the multicellular frame-porogen assembly.

At block 806, the method 800 includes removing the fused porogen network from the multicellular frame resulting in the polymeric septum membranes within the multicellular frame. Removal of the porogen network may be performed as described with reference to FIG. 3.

Examples described herein may improve upon existing manufacturing processes for installing acoustic septum in honeycomb cells by integrating formation, positioning, and defining porosity of the membrane by a single porogen fusion step. Example embodiments combine an external core structure of the device with the porogen fusion step. After fusion and removal of a solid support, the fused network may maintain adhesion to the core structure without any chemical treatment to promote adhesion. A suspended fused network also circumvents the need to modify the surface of the device, where a polymer matrix may have pooled to form a polymer skin, creating closed-celled foams. Furthermore, an ability to suspend a fused network can allow for other unique modifications to the shape of the septa membranes, such as creating a convex rather than planar septa structure.

The acoustic honeycomb structure and particulate leaching process described herein integrates septa membranes, with specific acoustic properties, within the lumen of the honeycomb cells. The fusing process promotes pore interconnectivity and can improve the acoustic properties. Structural and acoustical properties are determined via a single porogen fusing step. For example, the combination of porogen fusion with a solid support controls (1) the positioning of the foam within the cell lumen, (2) the thickness of the membrane and (3) the angular orientation of the septum membrane to the core wall.

Furthermore, the porogen fusing process controls: (1) pore interconnectivity within the septum membrane, (2) pore size within the septum membrane and (3) the control of the septum membrane attachment to the core wall. Pore interconnectivity and size can be modified by selecting porogens of different shapes and sizes to affect the acoustic properties. In addition, mixed porogen processes including (1) the combination of different sized porogens, (2) the combination of different types of porogens and (3) the combination of different types of particles (those that may or may not be removed) can increase the complexity of the final polymeric microstructure and affect acoustic properties. Additional porosity may be induced by dilution of polymer resin in solvent and evaporation of the solvent during the curing process. The foam septa can be formed from polymeric materials whose mechanical properties can be selected for specific acoustic and resonance performance properties and whose characteristics are independent of the overall structure and process. As an example, the acoustic honeycomb structures can be designed to control noise transmission, for example jet engine noise, and by fully bonding the septum membrane to the sidewall of the honeycomb cell, a pressure-tight seal is created to reduce or eliminate noise leakage pathways observed in non-sealed approaches.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An acoustic modifying structure comprising:
a multicellular frame; and
at least one porous septum membrane positioned in lumen of cells of the multicellular frame, wherein the at least one porous septum membrane has a thickness of about 1.0 mm to about 5.0 mm and wherein the at least one porous septum membrane comprises a substantially continuous matrix having pores with a size less than about 25% of the thickness of the septum membrane, wherein the at least one porous septum membrane comprises a porogen material.

2. The acoustic modifying structure of claim 1, wherein the at least one porous septum membrane includes pores in a range of about 1 μm to about 175 μm.

3. The acoustic modifying structure of claim 1, wherein the pores within one porous membrane within one lumen are interconnected.

4. The acoustic modifying structure of claim 1, wherein a single lumen contains two separate porous membranes.

5. The acoustic modifying structure of claim 1, wherein the at least one porous septum membrane has pores with a size less than about 15% of the thickness of the septum membrane.

6. The acoustic modifying structure of claim 1, wherein the porogen material is selected from a type of material consisting of a salt, a sugar, an organic solid, and a polymer particle.

7. The acoustic modifying structure of claim 6, wherein the porogen material is selected from a type of material consisting of a cubic particle, a spherical particle, an amorphous particle, a rod particle, a whisker-like particle, a leachable particle, and a non-removable polymer particle.

8. The acoustic modifying structure of claim 1, wherein the at least one porous septum membrane creates one or more of a pressure barrier, a flow restrictor, and a resonant cavity for controlling transmission of acoustic noise.

9. The acoustic modifying structure of claim 1, wherein the multicellular frame comprises a honeycomb frame.

10. An acoustic modifying structure comprising:
a multicellular frame; and
at least one porous septum membrane positioned in lumen of cells of the multicellular frame, wherein the at least one porous septum membrane comprises a substantially continuous matrix having pores with a size less than about 25% of the thickness of the septum membrane, wherein the at least one porous septum membrane comprises a porogen material.

11. The acoustic modifying structure of claim 10, wherein the at least one porous septum membrane includes pores in a range of about 1 μm to about 175 μm.

12. The acoustic modifying structure of claim 10, wherein the pores within one porous membrane within one lumen are interconnected.

13. The acoustic modifying structure of claim 10, wherein a single lumen contains two separate porous membranes.

14. The acoustic modifying structure of claim 10, wherein the at least one porous septum membrane has pores with a size less than about 15% of the thickness of the septum membrane.

15. The acoustic modifying structure of claim 10, wherein the porogen material is selected from a type of material consisting of a salt, a sugar, an organic solid, and a polymer particle.

16. The acoustic modifying structure of claim 15, wherein the porogen material is selected from a type of material consisting of a cubic particle, a spherical particle, an amorphous particle, a rod particle, a whisker-like particle, a leachable particle, and a non-removable polymer particle.

17. The acoustic modifying structure of claim 10, wherein the at least one porous septum membrane creates a pressure barrier for controlling transmission of acoustic noise.

18. The acoustic modifying structure of claim 10, wherein the at least one porous septum membrane creates a flow restrictor for controlling transmission of acoustic noise.

19. The acoustic modifying structure of claim 10, wherein the at least one porous septum membrane creates a resonant cavity for controlling transmission of acoustic noise.

20. The acoustic modifying structure of claim 10, wherein the multicellular frame comprises a honeycomb frame.

* * * * *